Jan. 27, 1942.  A. C. GRANT  2,271,120
COMPENSATED TWO-STAGE HOT AIR CONTROL SYSTEM
Filed Oct. 27, 1938
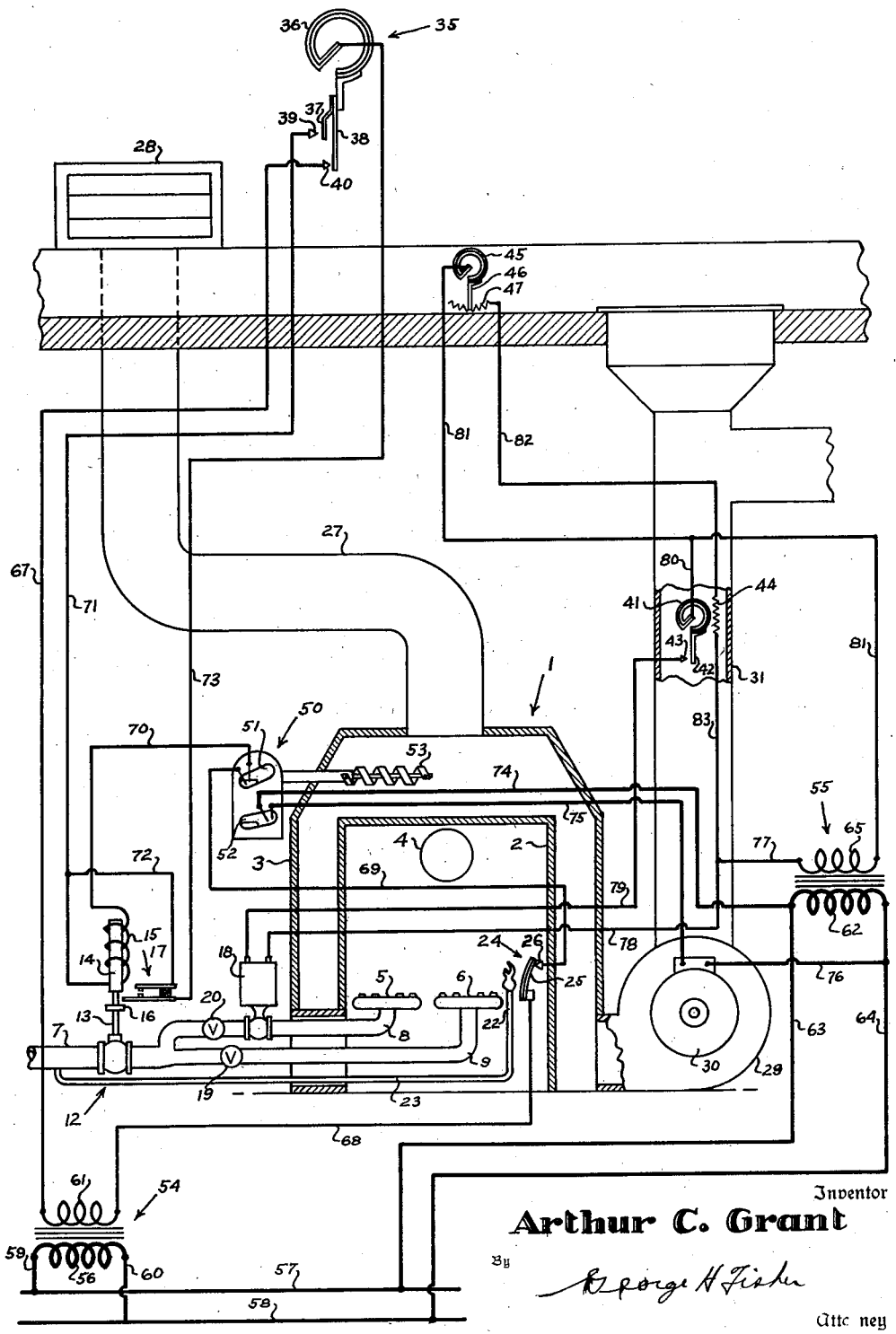
Inventor
Arthur C. Grant
By George H Fisher
Attorney Patented Jan. 27, 1942

2,271,120

UNITED STATES PATENT OFFICE 2,271,120

COMPENSATED TWO-STAGE HOT AIR CONTROL SYSTEM

Arthur C. Grant, St. Paul, Minn., assignor to Minneapolis-Honeywell Regulator Company, Minneapolis, Minn., a corporation of Delaware Application October 27, 1938, Serial No. 237,213

12 Claims. (Cl. 236—11)

My invention relates to air conditioning control, particularly to improvements in automatic temperature control in warm air heating systems.

In my system I provide a two-stage heating unit and control apparatus for governing the first and second stages so as to more nearly balance the heating capacity with the demands for heat necessary to be supplied. Thus I use a space thermostat for controlling the first stage of heating and a return air duct thermostat, which provides a relatively accurate indication of the heating load on the building as a whole, for controlling the second stage. My improvements further comprise a baseboard thermostat, which provides a relatively accurate indication of heating load due to outdoor temperatures, and by which I compensate the return air duct thermostats to lower its control point as baseboard temperatures fall. During colder weather, a greater differential is to be expected between temperature at the breathing line and at the return air register. Thus, during cooler weather without the compensating thermostat, the temperature of the return air would tend to cause the return air duct thermostat to turn on the second stage of heating each time the space thermostat called for heat, which is in reality unnecessary as far as heating load on the building as a whole is concerned. By my arrangement the second stage of heating is turned on at an indication of generally greater heating load on the building as a whole and during colder weather the control point of the return air duct thermostat is lowered so that it still retains its function without turning on the second stage during every cycle of heating. The main advantage and object of my invention, among others, is to supply heat more uniformly with respect to the demands and to reduce the number of "on" and "off" cycles of the heating equipment.

Another object is the provision, in a two-stage warm air heating system of controls comprising a space thermostat controlling the first stage, a return air duct thermostat controlling the second stage, and a baseboard thermostat for compensating the return air duct thermostat for variations in baseboard temperature.

Other objects and advantages of my invention and the manner in which I accomplish the above objects will become apparent from the detailed specification following, the invention residing in the improved combination, arrangement, and sequence of operation of the various parts.

The single figure of the drawing represents diagrammatically a warm air heating system having my invention embodied therein.

Referring to the figure, I have shown a warm air furnace or a boiler generally indicated at 1 comprising a combustion chamber 2 and a jacket 3 the upper part of which forms a bonnet enclosing the combustion chamber. A stack or flue 4 communicates with the combustion chamber and within the combustion chamber are located gas burners 5 and 6. Gaseous fuel is supplied to a conduit 7 which may connect to a gas main (not shown) and the conduit 7 has two branches 8 and 9 connecting with the burners 5 and 6, respectively. Interposed in the conduit 7 is a control valve 12 which I have chosen to disclose as of the electric solenoid type having a stem 13 connected to an armature 14 which cooperates with an electrical winding 15. Disposed on the stem 13 of valve 12 is a collar 16 which is arranged to actuate an auxiliary switch 17 when the valve stem is reciprocated.

Interposed in the branch conduit 8 is an electrical control valve generally indicated at 18 which may preferably be of the same type as the valve 12 but which may be smaller for reasons which will presently appear. Connected in the conduit 9 is an ordinary manually controlled valve 19 by means of which a restriction of a limited amount is placed in the conduit 9. A similar hand valve 20 is connected in the branch conduit 8 ahead of the valve 18. As will become more clear from the description of operation following, the valve 12 alone may be open at times and during these periods the amount of gas flowing to burner 6 will be determined by the amount of restriction in conduit 9 determined by the setting of valve 19. Similarly when both valves 12 and 18 are open the amount of fuel supplied to burner 5 is limited and may be adjusted by the setting of hand valve 20.

Numeral 22 indicates a constantly burning pilot burner of conventional type which is continuously supplied with fuel through a tube 23 communicating with conduit 7 ahead of the valve 12. Disposed adjacent the flame of the pilot burner 22 is a safety pilot generally indicated at 24 which may be of conventional and well known construction comprising a bimetal thermal element 25 operated with a fixed electrical contact 26. The safety pilot, as is well known in the art, forms a switch which is closed at all times when the pilot flame is burning and which, as will presently appear, operates to shut down the system in the event of extinguishment of the pilot flame.

For conveying heated air from the bonnet 3 of the furnace a warm air duct 27 is provided which connects with a warm air register 28 in the room being heated and which may have branch ducts leading to similar registers in other rooms. For enforcing the circulation of air throughout the system, a circulating fan 29 driven by an electric motor 30 is provided. The fan 29 takes suction from a return air conduit 31 which may have branches connecting with return air registers in various rooms being heated. The fan discharges into the bonnet or jacket of the furnace and forces air therethrough and throughout the system.

For controlling my system I provide various thermostatic controls, the system being primarily controlled by a room or space thermostat generally indicated at 35. The thermostat 35 is of the double contact type and may comprise a conventional bimetal thermostatic element 36 arranged to move a pair of flexible contact blades 37 and 38. The blades 37 and 38 cooperate with fixed electrical contacts 39 and 40, respectively.

Numeral 41 represents a single contact bimetal type thermostat having movable switch blade 42, this thermostat being disposed in return air duct 31 through which air is drawn from all the rooms being heated, by the fan 29. The movable blade 42 of thermostat 41 cooperates with a fixed electrical contact 43. Disposed adjacent to the bimetal element of thermostat 41 is an electrical heating resistance 44 which continuously supplies an amount of heat to the bimetal element which is predetermined by another thermostat 45 disposed substantially at the baseboard level in one of the rooms or spaces being heated. Thermostat 45 may be generally similar to thermostat 41 but having a movable arm 46 which is arranged to slide over a slide-wire resistance 47 as will become clear from the description of operation. Thermostat 45 and its associated resistance control the amount of heat supplied to thermostat 41 by the heating resistance 44.

Numeral 50 designates an additional control instrument comprising mercury switches 51 and 52 which are arranged to be operated by a helical thermostatic element 53 responsive to the temperature of the air within the bonnet 3. This type of switch is well known in the art and therefore need not be described in detail. In my particular switch the mercury tube 52 is tilted so as to close its contacts at a predetermined relatively low temperature within bonnet 3 and the switch 51 which is normally closed is arranged to be opened at a predetermined relatively high temperature in the bonnet 3, this latter mercury switch forming a high limit switch as will presently become apparent.

For providing power at suitable voltage for the various instruments and control devices of my system, I provide voltage step-down transformers generally indicated at 54 and 55. Transformer 54 comprises a primary winding 56 the terminals of which are connected to a pair of line conductors 57 and 58 by wires 59 and 60, respectively, the line conductors being connected to some suitable source of external power (not shown). Transformer 54 has a secondary winding 61 having a fewer number of turns than the primary as is conventional in this type of transformer. Transformer 55 may be similar to transformer 54 having a primary winding 62 connected to line conductors 57 and 58 by wires 63 and 64, respectively, and having a secondary winding 65.

I will now describe the complete operation of my system pointing out the novelty and utility thereof and the advantages to be gained thereby. With the parts in the position shown, both the thermostats 35 and 41 are satisfied and therefore the equipment is not in operation. Now should the temperature within the spaces or rooms being heated drop to a predetermined value, blade 38 of thermostat 35 will engage contact 40 and at a predetermined temperature which may be one or two degrees lower blade 37 will engage fixed contact 39. Upon both the blades 37 and 38 becoming engaged with their associated contacts as described an energizing circuit for opening the valve 12 will be completed as follows: from fixed contact 40 of thermostat 35 to a wire 67, secondary winding 61 of transformer 54, wire 68, safety pilot 24, wire 69, mercury switch 51, wire 70, coil winding 15, and wire 71 back to fixed contact 37 completing the circuit through the thermostat. Immediately upon completion of the above described circuit valve 12 will open and collar 16 on the valve stem 13 will engage the lower blade of switch 17 closing that switch and completing a maintaining circuit for coil winding 15 as follows: from fixed contact 40 through wire 67 and to coil winding 15 in the same manner as the circuit described above, from coil winding 15 through a portion of wire 71, wire 72, switch 17, and wire 73 to the thermostat 35, the circuit being completed through the thermostat. With the valve 12 in the open position fuel will be supplied to the burner 6 and heating will take place in the furnace as long as that valve is open. As soon as the bonnet temperature has risen to a high enough value suitable for heating purposes mercury switch 52 will close completing a circuit energizing motor 30 and starting fan 29 in operation. This circuit is as follows: from wire 63 which connects with line conductor 57 through wire 74, mercury switch 52, wire 75, motor 30, and wire 76 back to wire 64 which connects with line conductor 58. Heated air will now be supplied to the spaces being heated as long as the thermostat 35 is calling for heat. The thermostat 41 being disposed in the return air duct is responsive to a composite temperature resulting from the mixture of air volumes being returned from all the spaces or rooms being heated and therefore provides an indication of the heating load on the building as a whole. Assuming for the moment that thermostat 45 is in a certain position, thermostat 41 will close at a predetermined temperature at which the return air is relatively cool indicating that the heating load on the building is relatively heavy as may be brought about by the opening of an unusually large number of windows or doors for example. The space thermostat 35 is located at an altitude of substantially 5 ft. in the spaces being heated which is approximately the breathing line in a room and the thermostat 45 is located adjacent the baseboard. As is well known in the art, a baseboard thermostat such as the thermostat 45, provides a relatively accurate indication of the heating load on the building due to outdoor temperatures, that is, by reason of the cooler air falling there will be a differential in temperature between the levels of thermostats 35 and 45 and this differential will remain substantially constant if there is no appreciable change in outdoor temperatures. Now assuming that outdoor temperatures have not changed appreciably but that thermostat 41 closes for reasons explained above, immediately upon closure of thermostat 41 an energizing circuit for opening the valve 18 will be completed as follows: from secondary winding 65 of transformer 55 through wires 77, 78, valve 18, wire 79, fixed contact 43, thermostat 41, wire 80, and wire 81 back to the secondary winding 65. As soon as valve 18 opens fuel will also be supplied to burner 5 thereby producing second stage or maximum capacity operation of the furnace. As has been previously described, the volume of fuel supplied to each stage is adjustable by setting the hand valves 19 and 20. By reason of the additional burner now being in operation the temperature of the return air in duct 31 will rise and thermostat 41 will open interrupting the above described circuit therethrough and causing valve 18 to close. In this manner the valve 18 may cycle between its open and closed positions several times during a period of time in which the space thermostat 35 is calling for heat. The advantage of the arrangement so far described will be obvious in that the heating capacity of the furnace is increased correspondingly with the heating load on the building as a whole and consequently the space thermostat will remain satisfied for longer periods thereby reducing the amount of intermittent firing necessary in the furnace.

Whenever the outdoor temperature should fall thereby increasing the heating load the differential between the temperatures at the levels of the space theremostat 35 and the baseboard thermostat 45 will be increased by reason of the greater amount of heat leakage through the walls of the building. As the temperature adjacent the thermostat 45 falls blade 46 will move to the right along slide-wire resistance 47 and will decrease the amount of resistance in series with the heating resistance 44 the circuit therethrough being as follows: from secondary winding 65 through wire 81, thermostat 45, a part of slide-wire resistance 47, wire 82, heating resistance 44, wire 83, and wire 77 back to the secondary winding 65. Because of the reduced resistance in the circuit there will be an increased current flow and consequently increased heating at resistance 44. The increased heating will tend to cause blade 42 to move to the right and consequently the control point of thermostat 41 will be lower, that is, a lower temperature will now have to prevail in the return air duct 31 before thermostat 41 will close. In this manner the thermostat 45 acts to compensate the thermostat 41 for changes in the differential in temperature between the levels of space thermostats 35 and 45. The need for this compensation is that otherwise a decrease in return air duct temperature caused only by a change in heating load due to a decrease in outdoor temperature would cause thermostat 41 to close upon each call for heat by the space thermostat 35. On each call for heat the temperature at the breathing line would be brought up to a value to satisfy thermostat 35 but the differential between this level and the baseboard would remain. It is not necessary that the second stage of heating be turned on at each call for heat of the space thermostat 35 when there has been a drop in outdoor temperature and by reason of my arrangement for compensating the thermostat 41 it retains its desired function of operating the second stage of heating in response to changes in load on the building as a whole. As will be obvious the control point of thermostat 41 will be raised if the baseboard temperature should rise causing arm 46 of thermostat 45 to be moved to the left.

Referring again to the thermostat 35, by reason of the maintaining circuit above described, valve 12 will not be opened until both the blades 37 and 38 have become disengaged from their associated contacts. Obviously therefore this thermostat has a positive operating differential determined by the temperatures at which its blades engage their respective associated contacts. Whenever blade 38 disengages from contact 40 the above described maintaining circuit is interrupted and valve 12 will close thereby cutting off the flow of fuel and shutting down the system. It will be understood that the mercury switch 50 and the safety pilot 24 are in both the above described energizing circuits for valve 12 and either one is therefore operative to shut down the system in the manner already pointed out in the structural description.

In order to clearly point out the mode of operation of the applicant's system, the operation of a particular system under specific operating conditions will be described:

Consider the operation of a system having a room thermostat, such as that shown at 35 in the drawing, having an operating differential such that both contacts are closed if the temperature falls below 69° and both contacts are open if the temperature goes above 71°. Consider also that this system is supplied with a return air thermostat, such as that shown at 41 in the drawing, which has a fixed setting of 67°. It is to be assumed that these two thermostats are connected to a two-stage furnace in the same manner as the thermostats 35 and 41 in the drawing.

First consider the operation of such a system when the return air thermostat is not compensated. In such a system, the difference between the temperature at the room thermostat and the temperature in the return air duct increases as the outside temperature falls. The normal differential between these two temperatures, for the thermostat settings described, would be between two and four degrees. In such a system if the outside temperature should drop, the difference between the temperatures at these two thermostats would increase because of increased heat losses through the walls of the building. If the outside temperature should decrease sufficiently so that the temperature difference between the two thermostats became five degrees, then the return air thermostat would always be calling for heat when the room thermostat had either or both of its contacts closed. Therefore, the system would always operate on high stage. This operation would be intermittent and hence there would be a considerable and frequent fluctuation in the room temperature.

Now consider the situation which exists when a baseboard thermostat, such as that shown at 45 in the drawing, is added to the system just described and connected so as to readjust the setting of the return air thermostat in the manner previously indicated in this specification. Let it be assumed that this baseboard thermostat moves its slider from one end of the resistance 47 to the other as the temperature changes from 65° to 69°. Let it be further assumed that the resistance 47 and resistance 44 are so proportioned that when the baseboard temperature is 69°, the heat supplied to thermostat 41 is just sufficient to maintain it at a setting of 67°. Now let it be assumed that the outside temperature drops sufficiently so that the baseboard temperature decreases to 67° and the return air temperature drops to 65°. The change in these two temperatures for a given change in outside temperature is approximately equal. The change in the baseboard temperature causes operation of thermostat 45 to increase the supply of heat to thermostat 41, thereby effectively lowering its setting to 66°. Since the return air temperature has dropped to 65°, the thermostat 41 will close its contact, thus bringing on the high stage burner in the furnace, provided the thermostat 35 is calling for heat, until such time as the return air temperature again increases. The same change in outside temperature which causes the decrease in baseboard and return air temperatures likewise causes a drop in room temperature so that the thermostat 35 calls for heat. Therefore the furnace is operated at high stage until the return air temperature goes above 66°, at which time it will return to low stage operation. The low stage operation of the furnace may not be sufficient to maintain the space above the temperature at which the thermostat 35 is set. If not, then the furnace will continue at low stage until the return air temperature again drops below 66°. The net result of the addition of thermostat 45 to the control system is that the furnace is operated more at its low stage and less at its high stage than when the thermostat 45 was not present. This of course results in the general smoothing out of the supply of heat to the space, thereby preventing undesirable fluctuations in temperature. The high stage burner is brought on intermittently to take care of additional load which the low stage burner is unable to carry by itself.

It should be noted that in the previous description a change in temperature of two degrees at the baseboard resulted in an adjustment of the return air thermostat setting of only one degree. By having the change in setting of the return air thermostat less than the change in the baseboard temperature, the proportionate amount of time during which the high stage burner operates is increased as the difference between baseboard and room temperatures increases. In this manner provision is made so that under extreme weather conditions, the furnace will operate continuously at its high stage.

From the foregoing it is apparent that I have provided a new and useful control arrangement whereby the operation and control of heating systems is improved in a manner tending to promote economy. This system further reduces the amount of "on" and "off" cycling of the heating equipment and provides a more uniform supply of heat with respect to the load demands.

The single embodiment of my invention which I have disclosed is intended to be illustrative and is not to be construed in a limiting sense inasmuch as there are many changes in the form and arrangement of the invention which will occur to those skilled in the art but which are within the scope thereof. Therefore my invention should be no more limited than as determined by the restrictions imposed by the appended claims.

I claim as my invention:

1. In a temperature control system, in combination, a two-stage heating unit for supplying heating medium to a region to be heated, a space thermostat in said region for controlling first stage operation of said heating unit, a thermostat responsive to heating medium being returned from said region for controlling second stage operation of said heating unit, a third thermostat located at a relatively low level in said region, and means controlled by said third thermostat tending to cause said second mentioned thermostat to call for less heat as the temperature affecting said third thermostat falls.

2. In a system for controlling the temperature of an enclosed region, in combination, temperature changing means for heating a heat transporting medium and means to circulate said medium to and from said region, a space thermostat controlling said temperature changing means, another thermostat responsive to the temperature of the heat transporting medium being returned to the temperature changing means controlling said temperature changing means, a third thermostat located at a relatively low level in said region, and means controlled by said third thermostat tending to cause said another thermostat to call for less heat as the temperature affecting said third thermostat falls.

3. In a warm air heating system, in combination, a heating unit, fuel control means whereby said unit may be operated at increased or reduced capacity, means for circulating air from said unit to and from spaces being heated, a space thermostat controlling said fuel control means for operation at reduced capacity, a thermostat responsive to air being returned to said unit controlling said fuel control means for operation at increased capacity, another thermostat located at a relatively low lever in one of said spaces, and means controlled by said another thermostat tending to cause said second mentioned thermostat to call for less heat as the temperature to which said another thermostat is responsive falls.

4. In a warm air heating system, in combination, a heating unit, primary and secondary fuel valve means for regulating the supply of fuel to the heating unit, means for circulating air from said unit to and from spaces being heated, a space thermostat controlling said primary valve means, a thermostat responsive to the temperature of air being returned to the heating unit controlling said secondary valve means, another thermostat located at a relatively low level in one of the spaces being heated and means controlled by said another thermostat for compensating said second mentioned thermostat for variations in temperature differential between the levels of said space thermostat and said another thermostat.

5. In a warm air heating system, in combination, a heating unit, primary and secondary fuel valve means for regulating the supply of fuel to the heating unit, means for circulating air from said unit to and from spaces being heated, a space thermostat controlling said primary valve means, a thermostat responsive to the temperature of air being returned to the heating unit controlling said secondary valve means, another thermostat located at a relatively low level in one of the spaces being heated and means controlled by said another thermostat for lowering the control point of said second mentioned thermostat as the temperature affecting said another thermostat falls.

6. In a temperature control system, in combination, a heat exchanger, means for conveying heat transporting medium between said exchanger and a region wherein the temperature is to be controlled, thermostatic means responsive to temperature in said region controlling initiation and termination of operation of said heat exchanger, a second thermostatic means responsive to the temperature of heat transporting medium being conveyed between said region and said exchanger for controling the heat output of said exchanger, heating means adjacent said second thermostatic means for varying its control effect, and third thermostatic means responsive to temperature at a relatively low level in said region for increasing the effect of said heating means as said low level temperature decreases.

7. In a heating system for a space, fluid fuel burning heating means, means for circulating a fluid from said heating means to and from said space, a main valve controlling the flow of fuel to said heating means, a second valve for controlling the amount of fuel supplied to said heating means when said main valve is open, space temperature responsive means controlling said main valve, means responsive to the temperature of the air being returned to said heating means controlling said second valve, an auxiliary heater adjacent said last named thermostatic means, and means for controlling said auxiliary heater in accordance with a temperature condition of said space.

8. In a heating system for a space, fluid fuel burning heating means, means for circulating a fluid from said heating means to and from said space, a main valve controlling the flow of fuel to said heating means, a second valve for controlling the amount of fuel supplied to said heating means when said main valve is open, space temperature responsive means controlling said main valve, means responsive to the temperature of the air being returned to said heating means controlling said second valve, an auxiliary heater adjacent said last named thermostatic means, and means for controlling said auxiliary heater in accordance with the temperature at a relatively low level in said space.

9. In a heating system for a space, fluid fuel burning heating means, means for circulating a fluid from said heating means to and from said space, a main valve controlling the flow of fuel to said heating means, a second valve for controlling the amount of fuel supplied to said heating means when said main valve is open, means for maintaining a minimum flow of fuel to said heating means when said second valve is closed and said main valve is open, space temperature responsive means controlling said main valve, means responsive to the temperature of the air being returned to said heating means controlling said second valve, an auxiliary heater adjacent said last named thermostatic means, and means for controlling said auxiliary heater in accordance with a temperature condition of said space.

10. In a heating system for a space, in combination, heating means operable at either of two different stages of heat output, means for circulating a fluid from said heating means to and from said said space, a first thermostat located at a normal breathing level in said space for controlling initiation and termination of heating by said heating means, a second thermostat located in the path of the fluid returning to the heating means from said space for controlling the output stage at which said heating means operates, a third thermostat located at a low lever in said space, and means controlled by said third thermostat for lowering the control point of said second thermostat as the temperature at said low level decreases.

11. In a heating system for a space, in combination, heating means, means for circulating a fluid from said heating means to and from said space, means including a first thermostat responsive to the temperature in said space for controlling initiation and termination of heating by said heating means, means including a second thermostat responsive to the temperature of the fluid returning to the heating means from said space for controlling the amount of heat produced by said heating means, a third thermostat located at a relatively low level in said space, and means controlled by said third thermostat for lowering the control point of said second thermostat as the temperature at said low level decreases.

12. In a heating system for a plurality of spaces, in combination, heating means, means for circulating a fluid from said heating means to and from said spaces, means including a first thermostat responsive to the temperature in one of said spaces for controlling initiation and termination of heating by said heating means, means including a second thermostat responsive to a temperature indicative of the total heating load for controlling the amount of heat produced by said heating means, a third thermostat located at a relatively low level in one of said spaces, and means controlled by said third thermostat for lowering the control point of said second thermostat as the temperature at said low level decreases.

ARTHUR C. GRANT.